United States Patent
Nelson et al.

(10) Patent No.: US 10,117,545 B2
(45) Date of Patent: Nov. 6, 2018

(54) TWO SIDED GRILL WITH EASY CLEAN FEATURES

(71) Applicant: TAYLOR COMMERCIAL FOODSERVICE INC., Rockton, IL (US)

(72) Inventors: Dennis J. Nelson, Rockford, IL (US); Ronald J. Glavan, Rockton, IL (US)

(73) Assignee: Taylor Commercial Foodservice Inc., Rockton, IL (US)

(*) Notice: Subject to any disclaimer, the term of this patent is extended or adjusted under 35 U.S.C. 154(b) by 465 days.

(21) Appl. No.: 14/695,132

(22) Filed: Apr. 24, 2015

(65) Prior Publication Data

US 2015/0305558 A1    Oct. 29, 2015

Related U.S. Application Data

(60) Provisional application No. 61/983,557, filed on Apr. 24, 2014.

(51) Int. Cl.
  *A47J 37/06*  (2006.01)
  *A47J 37/07*  (2006.01)

(52) U.S. Cl.
  CPC .......... *A47J 37/0611* (2013.01); *A47J 37/07* (2013.01); *A47J 37/0786* (2013.01); *A47J 2037/0617* (2013.01)

(58) Field of Classification Search
  CPC .......... A47J 27/14; A47J 27/58; A47J 27/122; A47J 36/08; A47J 36/14; A47J 47/20; A47J 2037/0617; A47J 37/0611; A47J 37/07; A47J 37/0786

USPC ................ 99/375; 126/53, 214 D, 383.1
See application file for complete search history.

(56) References Cited

U.S. PATENT DOCUMENTS

| | | | | |
|---|---|---|---|---|
| 5,109,990 A * | 5/1992 | Murphy | ............. | A47J 47/20 211/41.3 |
| 5,473,976 A * | 12/1995 | Hermansson | ........ | A47J 37/0611 99/349 |
| 6,401,275 B1 * | 6/2002 | Garner | ............. | A47J 47/20 4/658 |
| 2007/0254078 A1 * | 11/2007 | Calzada | ............. | A47J 37/0611 426/523 |

(Continued)

FOREIGN PATENT DOCUMENTS

WO    2014144335 A1    9/2014

*Primary Examiner* — Dana Ross
*Assistant Examiner* — Joe E Mills, Jr.
(74) *Attorney, Agent, or Firm* — Brinks Gilson & Lione

(57) ABSTRACT

A grill is provided including a base structure. A lower platen assembly is connected to the base structure and includes a lower grill plate having a first cooking surface. An upper platen assembly is connected to the base structure and includes an upper grill plate having a second cooking surface movable between a raised position and a lowered position. A backsplash is arranged at a joint between the upper platen assembly and the lower platen assembly. The backsplash includes a partially open compartment within which a back end of the upper grill plate is arranged when in the raised position. The upper platen assembly includes an extended back end configured to direct grease away from the cooking surface. When the upper platen assembly is in the lowered position, the extended back end if offset from the first cooking surface.

16 Claims, 6 Drawing Sheets

(56) References Cited

U.S. PATENT DOCUMENTS

| | | | |
|---|---|---|---|
| 2010/0083440 A1* | 4/2010 | Spurlock | A47J 47/20 4/658 |
| 2011/0177222 A1* | 7/2011 | Calzada | A47J 37/0611 426/523 |
| 2013/0174836 A1* | 7/2013 | Mutangadura | A47J 27/58 126/385.1 |
| 2014/0026764 A1* | 1/2014 | Sykes | A47J 37/06 99/349 |

* cited by examiner

TWO SIDED GRILL WITH EASY CLEAN FEATURES

CROSS-REFERENCE TO RELATED APPLICATION

This application claims the benefit of U.S. provisional patent application Ser. No. 61/983,557 filed Apr. 24, 2014, the entire contents of which are incorporated herein by reference.

BACKGROUND OF THE INVENTION

The present invention relates generally to a grill, and more particularly to a clam shell style grill with features to protect a joint between an upper plate and a moveable lower plate.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

Other conventional grills, such as clamshell grills for example, are capable of simultaneously cooking two sides of various food items, such as hamburger patties, sausage patties, chicken, or other foods. In particular, clamshell grills are often used in commercial establishments, such as fast-food restaurants for example, because they reduce overall cooking time and the amount of operator attention required for cooking.

A conventional clamshell grill generally includes an upper platen assembly movably connected to a lower platen assembly. For example, the upper platen assembly may be pivotally coupled to the lower platen assembly for movement between a lower cooking position overlying the lower platen assembly and a raised position inclined upwardly from the lower platen assembly. When the upper platen assembly is in the lowered cooking position, a gap is created between the upper and lower platen assemblies. This gap is generally adjustable according to the thickness of the food being cooked. For example, hamburger patties are pre-formed in several different sizes (i.e. a quarter pound patty has a greater thickness than a regular patty). To cook the food, an operator selects the gap size and a cooking time via an operator interface for the food item being cooked.

One problem with conventional clamshell grills is that the compression force applied by the upper platen assembly on the food being cooked is limited to the weight of the platen. In addition, portions of the grill, such as the joint between the upper and lower platen assemblies for example, are exposed to grease and other debris which may cause malfunction or even complete failure of the grill.

BRIEF DESCRIPTION OF THE INVENTION

According to an embodiment of the invention, a grill is provided including a base structure. An upper platen assembly is connected to the base structure and includes an upper grill plate movable between a raised position and a lowered position. A lower platen assembly is connected to the base structure and includes a lower grill plate. A backsplash is arranged at a joint between the upper platen assembly and the lower platen assembly. The backsplash includes a partially open compartment within which a back end of the upper grill plate is arranged when in the raised position.

According to another embodiment of the invention, a grill is provided including a base structure. A lower platen assembly is connected to the base structure and includes a lower grill plate having a first cooking surface. An upper platen assembly is connected to the base structure and includes an upper grill plate movable between a raised position and a lowered position. The upper grill plate has a second cooking surface and an extended back end such that when in the lowered position, the extended back end of the upper grilling plate is offset from the first cooking surface.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 5:
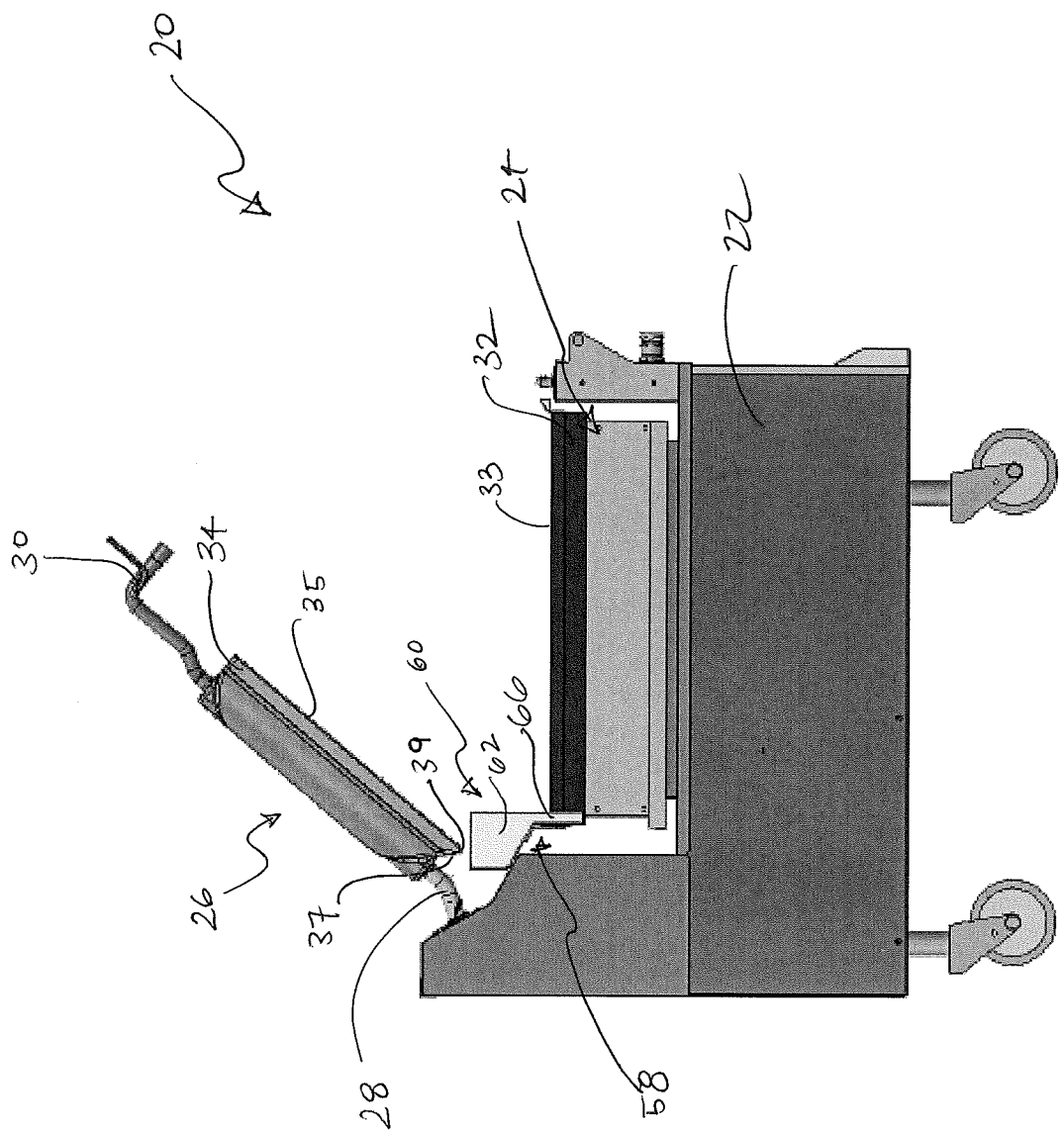
FIG. 5 schematically illustrates a side view of a grill having a backsplash arranged at the joint between the upper platen assembly and the lower platen assembly according to an embodiment of the invention.

Referring now to the FIGS., a grill 20 is illustrated having a rigid base structure 22 supporting a lower platen assembly 24 and an upper platen assembly 26. The upper platen assembly 26 may be fixed relative to the base structure 22 or alternatively, may be movably attached to the base structure 22 with a mounting structure 28 such that the upper platen assembly 26 is configured to move between a lowered, cooking position (FIG. 5a) and an upper raised position (FIG. 5b) relative to the lower platen assembly 24. In one embodiment, the mounting structure 28 is a hinge such that the upper platen assembly 26 is configured to pivot relative to the lower platen assembly 24; however, in other embodiments, the upper platen assembly 26 may be vertically lowered and raised in a generally linear motion. The upper platen assembly 26 may be moved between the raised and lowered positions either automatically or manually. In embodiments where the upper platen assembly 26 is moved manually, the upper platen assembly 26 may include a handle 30 that can be grabbed by an operator to move the upper platen assembly 26 between the raised and lowered positions. When the upper platen assembly 26 is lifted by an operator to the raised position, the grilling surface 33 the lower platen assembly 24 is exposed.

The lower platen assembly 24 includes a lower grill plate 32 and the upper platen assembly 26 includes an upper grill plate 34. Food items are placed on an exposed grilling surface 33 of the lower grill plate 32 by the operator for cooking. The operator moves the upper platen assembly 26, such as via handle 30 or by initiating a command to a controller for example, to the lowered position such that the one or more food items to be cooked are positioned within a gap 36 formed between the upper and lower grill plates 32, 34.

The lower grill plate 32 is configured to provide heat to the lower side of one or more food items placed thereon and the upper grill plate 34 is configured to provide heat to an upper side of the food items located on the lower grill plate 32. The upper and lower grill plates 32, 34 are heated by a heater (not shown) to cook the food items. In order to transmit heat to the food items cooked by the grill, the lower and upper grill plates 32, 34, respectively, may be formed of a heat-conducting material, such as cast aluminum, abrasion-resistant steel, cast iron, stainless steel, mild steel, a ceramic material, or other suitable heat conducting materials used in grills. Although the lower and upper grill plates 32, 34 are shown as having a rectangular shape, one or both of the grill plates 32, 34 may also be formed into other shapes, such as circular or oval shapes for example.

Figure 1:
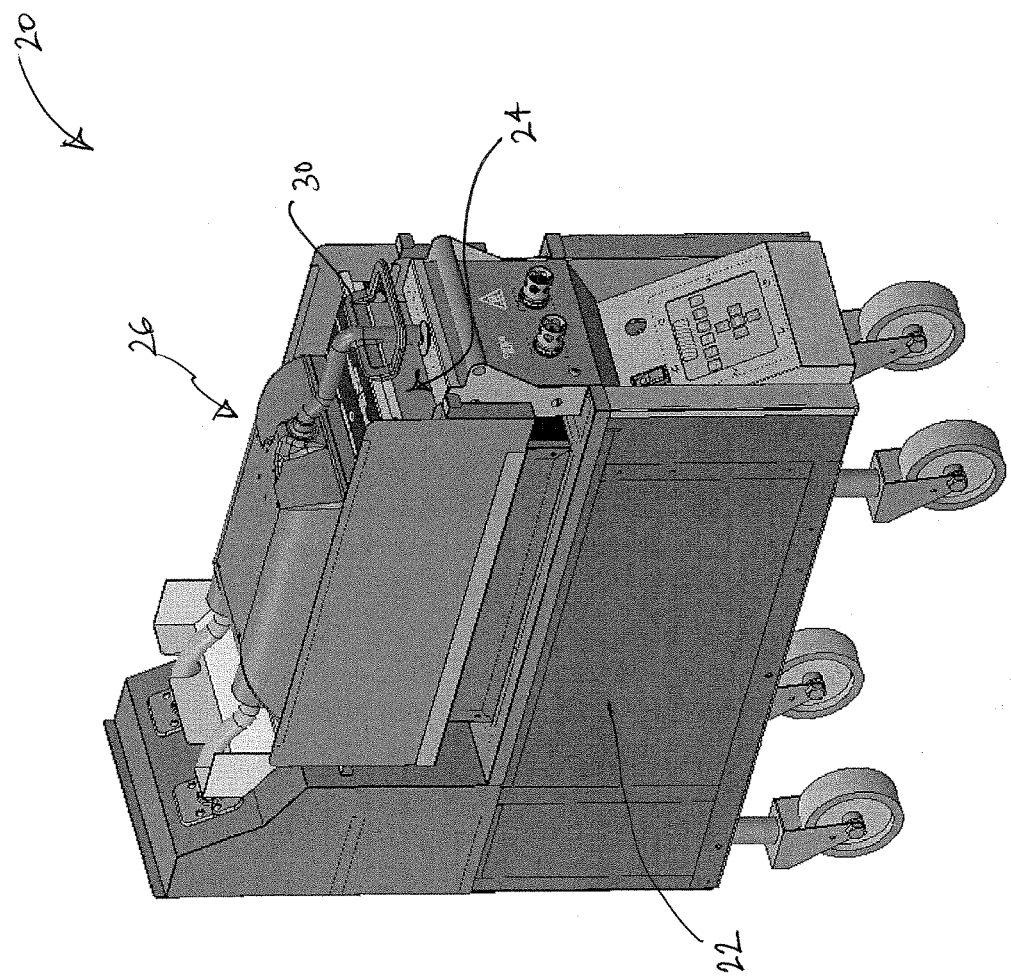
FIG. 1 schematically illustrates a perspective view of a grill in a lowered position according to an embodiment of the invention.
Figure 2:
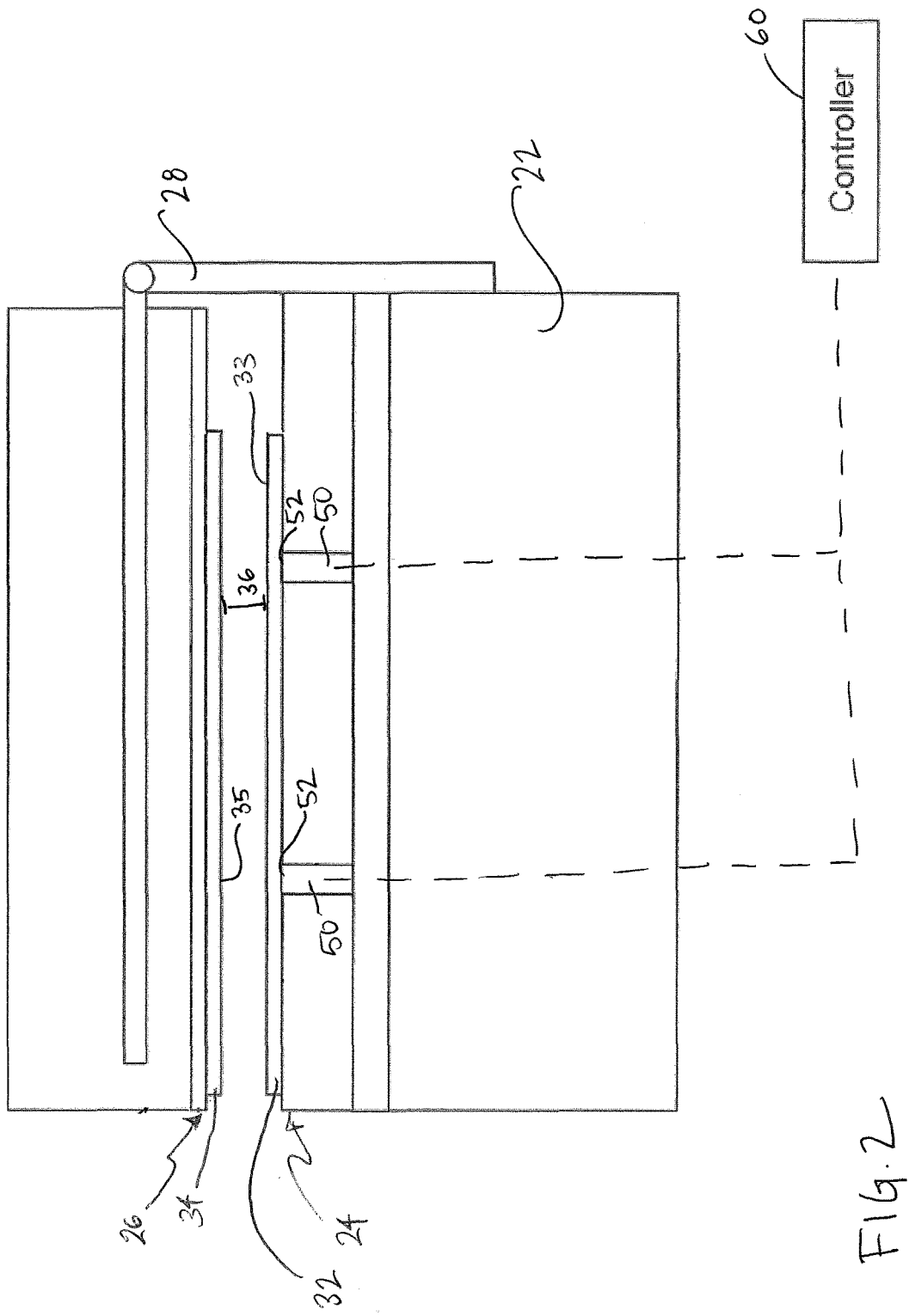
FIG. 2 schematically illustrates a cross-sectional view of a grill according to an embodiment of the invention.
Figure 3:
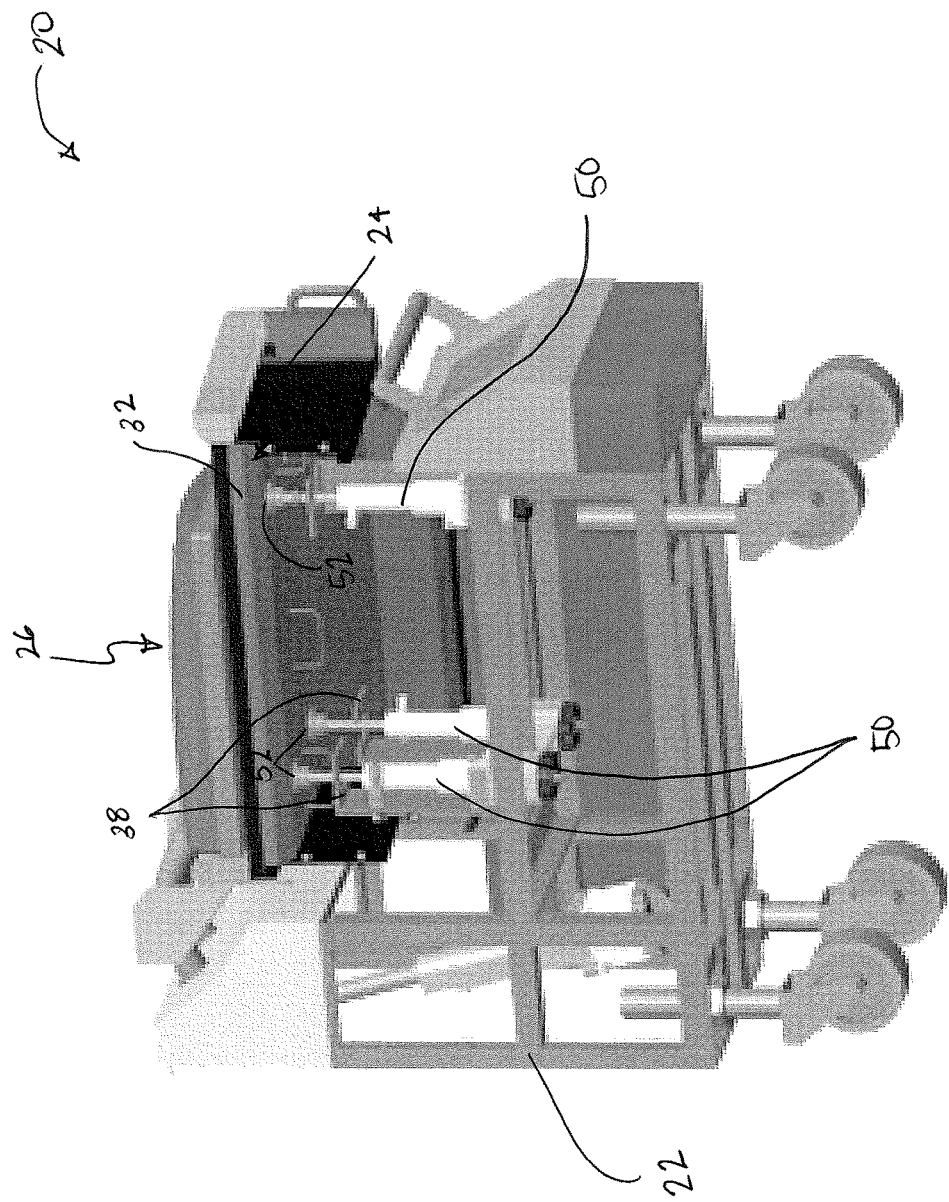
FIG. 3 schematically illustrates a perspective view of a grill having a portion of the base structure removed according to an embodiment of the invention.
Figure 4:
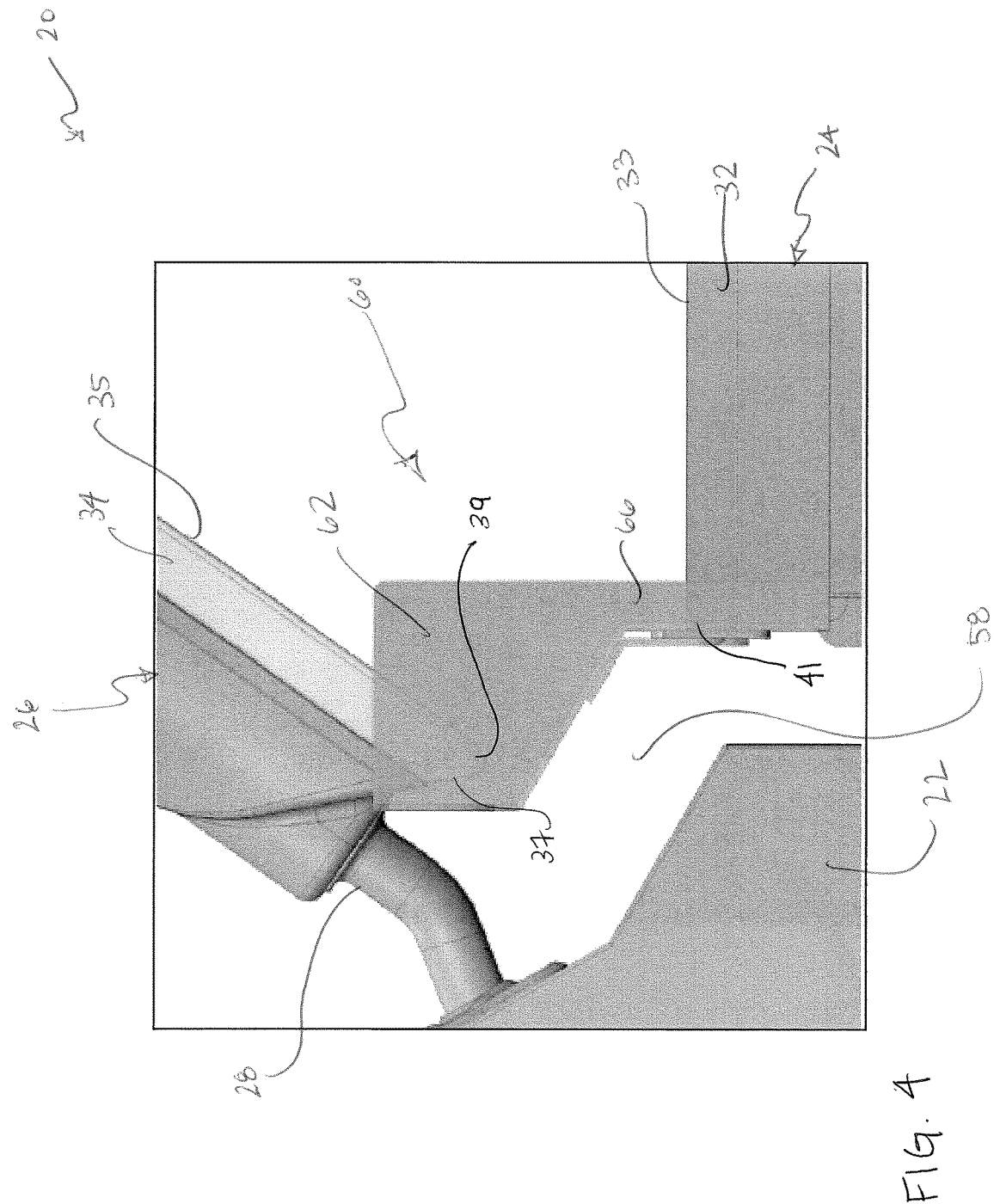
FIG. 4 schematically illustrates a side view of the joint between the upper platen assembly and the lower platen assembly when the upper platen assembly is in a raised position according to an embodiment of the invention.

As shown in FIGS. 2-3, the lower platen assembly 24 includes a plurality of leveling mechanisms 50 for controlling the tilt, angle, and/or attitude of the lower grill plate 32. Although three leveling mechanisms 50 are illustrated in the FIGS., embodiments having any number of leveling mechanisms 50 are within the scope of the invention. A portion of each leveling mechanism 50 is connected to the base structure 22, such as with a mounting bracket for example 38, and a first end 52 of each leveling mechanism 50 is connected to the lower grill plate 32. The first ends 52 may be positioned about a peripheral region of the lower grill plate 32. It is to be understood that the first end 52 of the leveling mechanisms 50 do not need to be positioned at an edge of the lower grill plate 32. Rather, a person having ordinary skill in the art would understand that the peripheral region encompasses the portion of the lower grill plate 32 that allows suitable control of the position of the lower grill plate 32 by the extension or retraction of the leveling mechanisms 50.

A control 60 is configured to independently operate each of the plurality of leveling mechanisms 50. As a result, the lower grill plate 32 may be arranged in a non-horizontal configuration. In one embodiment, the leveling mechanisms 50 are linear actuators, such as electric, hydraulic, pneumatic, or mechanical actuators for example. One or more sensors (not shown) are configured to monitor each of the plurality of leveling mechanisms 50 and detect when the lower grill plate 32 contacts the upper grill plate 34. In one embodiment, the sensors are Hall Effect sensors or encoders configured to monitor the position of a movable portion 54 of the leveling mechanisms 50 and determine when each leveling mechanism 50 reaches a stall position. Alternatively, other types of sensors, such as sensors configured to monitor current, load, or another characteristic of the plurality of leveling mechanisms 50 for example, is also within the scope of the invention. Through the leveling mechanisms 50, the position of the lower grill plate 32 and/or the initial gap between the lower and upper grill plates 32, 34, respectively, may be adjusted to accommodate the variation of thickness of the food items to be cooked on the grill 20. Moreover, the plurality of leveling mechanisms 50 may apply a positive pressure on the lower grill plate 32 and consequently on the food items as they are being cooked on the grill 20.

The grill 20 may be automatically calibrated to ensure that the gap 36 between the lower grill plate 32 and the upper grill plate 34 is maintained at a desired size. By calibrated, it is meant that the upper grill plate 34 and the lower grill plate 32 are level to one another to ensure proper cooking of food items. In one example, the grill 20 is calibrated daily to correct any unleveling of the lower grill plate 32 that may have occurred during the previous day.

When the upper platen assembly 26 is in the raised position, grease adhered to a cooking surface 35 thereof tends to accumulate on the back end 37 of the upper grill plate 34 near a joint 58 between the platen assemblies 24, 26 and the base structure 22. A portion of the accumulated grease tends to drip from the end 37 into the joint 58, and a portion of the grease commonly carbonizes on the plate 34 as a result of the heat of the cooking surface 35. To capture the falling grease, a removable backsplash 60, as shown in FIGS. 4-7, may be positioned at the joint 58 generally between the lower and upper platen assemblies 24, 26. Because the backsplash 60 is not an integral portion of the base structure 22, the backsplash 60 can be easily removed for maintenance or to clean any accumulated grease and debris accumulated therein.

Figure 6:
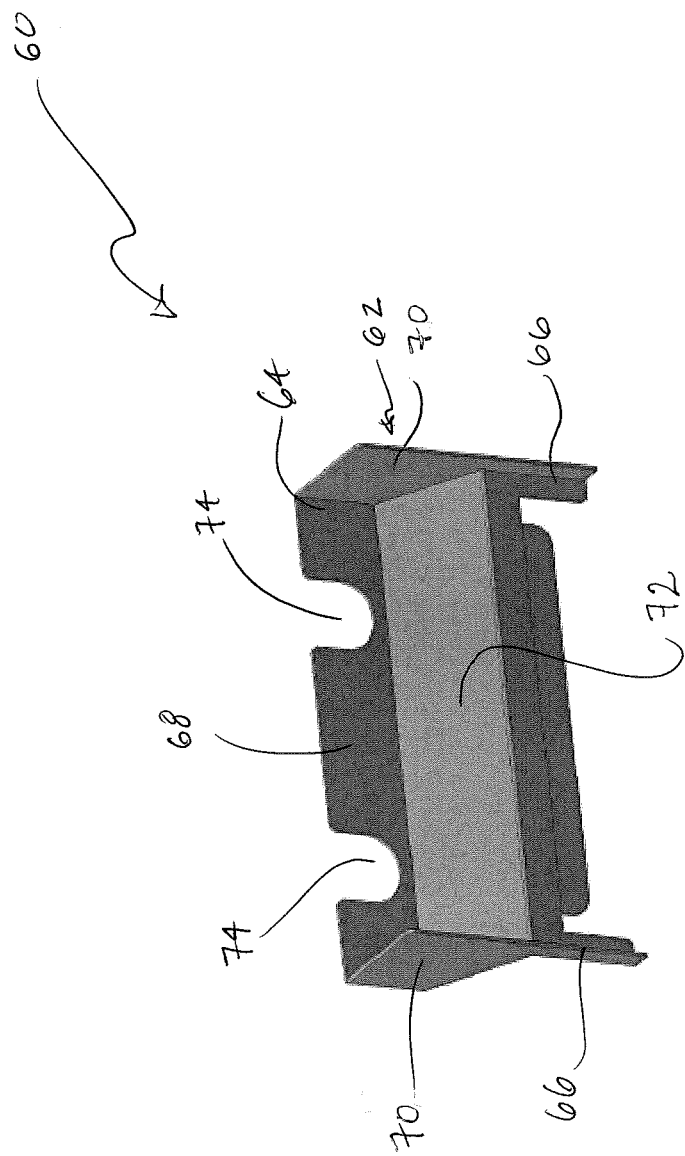
FIG. 6 schematically illustrates a perspective view of the backsplash according to an embodiment of the invention.

Referring to FIG. 6, the backsplash 60 is illustrated in more detail. The backsplash 60 includes an angled body 62 forming a partially open compartment 64 and at least one connecting member 66. The angled body 64 has a sidewall 68, two end plates 70, and a sloped base 72 coupled to the sidewall 68 and two end plates 70. In one embodiment, one or more holes 74 generally complementary to a portion of the mounting structure 28 are formed in the sidewall 68. The at least one connecting member 66, coupled to or integrally formed with the angled body 62, is configured to mount the backsplash 60 to the lower grill plate 32. The backsplash 60 may be formed by bending or welding a piece of sheet metal for example In the non-limiting embodiment illustrated in the FIGS., the backsplash 60 includes two connecting members 66 separated from one another by a distance substantially equal to the width of the lower grill plate 32. As shown, the two connecting members 66 are slidably received about the corners of the lower grill plate 32. When the backsplash 60 is installed, the open compartment 64 formed by the angled body 62 is arranged generally vertically above a back end 39 of the lower grill plate 32 such that when the upper platen assembly 26 is in the raised position, the back end 37 of the upper grill plate 34 is generally arranged within the compartment 64. The backsplash 60 is configured to channel grease collected therein to the lower grill plate 32.

In another embodiment of the invention, the upper grill plate 34 has an extended back end 37. As a result, when the upper platen assembly 26 is in the lowered position, the back end 37 is substantially offset from the cooking surface 33 of the lower grill plate 32. The back end 37 includes a contoured drip edge 39 configured to direct grease away from the grilling surface 35 of the upper grill plate 34 such that the grease accumulated on the drip edge does not carbonize on the cook surface 35. In one embodiment, the contoured drip edge 39 has a non-right angle shape, such as a generally convex curvature for example. In embodiments where a backsplash 60 is mounted at the joint 58 between the upper and lower platen assemblies 24, 26, the integral drip edge 39 is located adjacent the interface between the sloped base 72 and the sidewall 68 of the angled body 62. Grease accumulated on the integral drip edge 39 is configured to drip from the upper grill plate 34 into the compartment 64 of the backsplash 60 where it will slide, as a result of gravity, onto a portion of the lower grill plate 32.

Inclusion of the integral drip edge 39 on the extended back end 37 of the upper grill plate 34 and/or a backsplash 60 mounted at the joint 58 formed between the upper and lower platen assemblies 24, 26, will reduce the amount of cleaning required to maintain the proper functionality of the grill 20. As a result, the overall life and reliability of the grill 20 is improved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A grill comprising:
a base structure;
a lower platen assembly connected to the base structure and including a lower grill plate;
a joint formed between the lower platen assembly and the base structure;
an upper platen assembly connected to the base structure, the upper platen assembly including an upper grill plate movable between a raised position and a lowered position, wherein in the raised position, a back end of the upper grill plate is disposed between the base structure and the lower grill plate, in alignment with the joint; and
a removable backsplash arranged at the joint, the backsplash having an angled body defining a partially open compartment within which the back end of the upper grill plate is arranged when in the raised position, wherein the angled body directs grease from the back end of the upper grill plate to the lower grill plate.

2. The grill according to claim 1, wherein the backsplash comprises:
the angled body including a sidewall, two end walls, and a sloped base plate connected to form the partially open compartment, and
at least one connecting member configured to mount the backsplash to a portion of the lower grill plate.

3. The grill according to claim 2, wherein the backsplash includes two connecting members separated by a distance substantially equal to a width of the lower grill plate.

4. The grill according to claim 2, wherein each connecting member is configured to surround a corner of the lower grill plate.

5. The grill according to claim 1, wherein the backsplash is formed from a sheet metal material.

6. The grill according to claim 1, wherein an extended back end of the upper grill plate includes a drip edge.

7. The grill according to claim 6, wherein when the upper platen assembly is in the lowered position the extended back end of the upper grill plate is offset from the cooking surface of the lower grill plate.

8. The grill according to claim 6, wherein when the upper platen assembly is in the raised position, the drip edge of the extended back end is arranged within the partially open compartment of the backsplash.

9. A grill comprising:
a base structure;
a lower platen assembly connected to the base structure and including a lower grill plate having a first cooking surface;
an upper platen assembly connected to the base structure, the upper platen assembly including an upper grill plate movable between a raised position and a lowered position, the upper grill plate having a second cooking surface and an extended back end including an integral contoured drip edge configured to direct grease away from the second cooking surface, wherein when the upper platen assembly is in the lowered position, the extended back end is offset from the first cooking surface.

10. The grill according to claim 9, wherein the integral drip edge has a generally convex curvature.

11. The grill according to claim 9, wherein grease accumulated on the drip edge of the extended back end does not carbonize on the cook surface.

12. The grill according to claim 9, further comprising a backsplash arranged at a joint between the upper platen assembly and the lower platen assembly, the backsplash having a partially open compartment within which the extended back end of the upper grill plate is arranged when the upper platen assembly is in the raised position.

13. The grill according to claim 9, wherein the backsplash comprises:
an angled body including a sidewall, two end walls, and a sloped base plate connected to form the partially open compartment, and
at least one connecting member configured to mount the backsplash to a portion of the lower grill plate.

14. The grill according to claim 13, wherein the backsplash includes two connecting members separated by a distance substantially equal to a width of the lower grill plate.

15. The grill according to claim 13, wherein each connecting member is configured to surround a corner of the lower grill plate.

16. The grill according to claim 9, wherein the backsplash is formed from a sheet metal material.

\* \* \* \* \*